United States Patent
Connolly et al.

(10) Patent No.: US 9,984,676 B2
(45) Date of Patent: May 29, 2018

(54) FEATURE NORMALIZATION INPUTS TO FRONT END PROCESSING FOR AUTOMATIC SPEECH RECOGNITION

(75) Inventors: Dermot Connolly, Aachen (DE); Daniel Willett, Walluf (DE)

(73) Assignee: Nuance Communications, Inc., Burlington, MA (US)

( * ) Notice: Subject to any disclaimer, the term of this patent is extended or adjusted under 35 U.S.C. 154(b) by 21 days.

(21) Appl. No.: 14/414,793

(22) PCT Filed: Jul. 24, 2012

(86) PCT No.: PCT/US2012/047911
§ 371 (c)(1),
(2), (4) Date: Feb. 16, 2015

(87) PCT Pub. No.: WO2014/018004
PCT Pub. Date: Jan. 30, 2014

(65) Prior Publication Data
US 2015/0206527 A1    Jul. 23, 2015

(51) Int. Cl.
*G10L 15/02* (2006.01)
*G10L 15/24* (2013.01)
*G10L 25/24* (2013.01)

(52) U.S. Cl.
CPC .............. *G10L 15/02* (2013.01); *G10L 15/24* (2013.01); *G10L 25/24* (2013.01)

(58) Field of Classification Search
CPC ...................................................... G10L 15/02
See application file for complete search history.

(56) References Cited

U.S. PATENT DOCUMENTS

| | | | |
|---|---|---|---|
| 4,817,158 A * | 3/1989 | Picheny | G10L 15/02 704/224 |
| 5,794,189 A | 8/1998 | Gould | |
| 5,930,753 A * | 7/1999 | Potamianos | G10L 15/065 704/256.2 |
| 6,167,377 A | 12/2000 | Gillick et al. | |

(Continued)

FOREIGN PATENT DOCUMENTS

EP      2151822 A1 *   2/2010   ......... G10L 21/0208

OTHER PUBLICATIONS

Jakovljević, Nikša, et al. "Energy normalization in automatic speech recognition." Text, Speech and Dialogue. Springer Berlin Heidelberg, 2008.*

(Continued)

*Primary Examiner* — Brian L Albertalli
(74) *Attorney, Agent, or Firm* — Banner & Witcoff, Ltd.

(57) ABSTRACT

A computer-implemented method is described for front end speech processing for automatic speech recognition. A sequence of speech features which characterize an unknown speech input is received with a computer process. A first subset of the speech features is normalized with a computer process using a first feature normalizing function. A second subset of the speech features is normalized with a computer process using a second feature normalizing function different from the first feature normalizing function. The normalized speech features in the first and second subsets are combined with a computer process to produce a sequence of mixed normalized speech features for automatic speech recognition.

20 Claims, 2 Drawing Sheets

(56) References Cited

U.S. PATENT DOCUMENTS

| | | | | |
|---|---|---|---|---|
| 6,173,258 | B1* | 1/2001 | Menendez-Pidal | G10L 15/02 704/226 |
| 6,594,382 | B1* | 7/2003 | Woodall | G06K 9/4609 382/156 |
| 6,718,299 | B1 | 4/2004 | Kondo et al. | |
| 6,957,183 | B2* | 10/2005 | Malayath | G10L 15/02 704/236 |
| 7,930,181 | B1 | 4/2011 | Goffin et al. | |
| 2003/0204394 | A1* | 10/2003 | Garudadri | G10L 15/02 704/201 |
| 2003/0204398 | A1* | 10/2003 | Haverinen | G10L 15/20 704/233 |
| 2004/0117181 | A1* | 6/2004 | Morii | G10L 17/12 704/234 |
| 2005/0182621 | A1* | 8/2005 | Zlokarnik | G10L 15/02 704/224 |
| 2008/0010065 | A1 | 1/2008 | Bratt et al. | |
| 2008/0228477 | A1* | 9/2008 | Fingscheidt | G10L 15/20 704/233 |
| 2008/0292273 | A1* | 11/2008 | Wang | H04N 5/76 386/249 |
| 2009/0138265 | A1* | 5/2009 | Willett | G10L 15/30 704/251 |
| 2009/0299741 | A1* | 12/2009 | Chittar | G10L 15/01 704/233 |
| 2011/0066429 | A1* | 3/2011 | Shperling | G10L 25/78 704/228 |
| 2012/0245940 | A1* | 9/2012 | Willett | G10L 15/32 704/244 |
| 2013/0185070 | A1* | 7/2013 | Huo | G10L 15/063 704/243 |

OTHER PUBLICATIONS

Li, Qi, et al. "Robust endpoint detection and energy normalization for real-time speech and speaker recognition." Speech and Audio Processing, IEEE Transactions on 10.3 (2002): 146-157.*
Zhu, Weizhong, and Douglas O'Shaughnessy. "Log-Energy Dynamic Range Normalizaton for Robust Speech Recognition." Acoustics, Speech, and Signal Processing, 2005. Proceedings.(ICASSP'05). IEEE International Conference on. vol. 1. IEEE, 2005.*
Barras, Claude, and Jean-Luc Gauvain. "Feature and score normalization for speaker verification of cellular data." Acoustics, Speech, and Signal Processing, 2003. Proceedings.(ICASSP'03). 2003 IEEE International Conference on. vol. 2. IEEE, 2003.*
Molau, Sirko, Florian Hilger, and Hermann Ney. "Feature space normalization in adverse acoustic conditions." Acoustics, Speech, and Signal Processing, 2003. Proceedings.(ICASSP'03). 2003 IEEE International Conference on. vol. 1. IEEE, 2003.*
Viikki, Olli, David Bye, and Kari Laurila. "A recursive feature vector normalization approach for robust speech recognition in noise." Acoustics, Speech and Signal Processing, 1998. Proceedings of the 1998 IEEE International Conference on. vol. 2. IEEE, 1998.*
Molau, Sirko, Daniel Keysers, and Hermann Ney. "Matching training and test data distributions for robust speech recognition." Speech Communication 41.4 (2003): 579-601.*
Kingsbury, Brian, et al. "Toward domain-independent conversational speech recognition." Interspeech. 2003.*
Garcia, Luz, et al. "Parametric nonlinear feature equalization for robust speech recognition." 2006 IEEE International Conference on Acoustics Speech and Signal Processing Proceedings. vol. 1. IEEE, 2006.*
Zhu, Weizhong, and Douglas O'Shaughnessy. "Log-Energy Dynamic Range Normalizaton for Robust Speech Recognition." Proceedings.(ICASSP'05). IEEE International Conference on Acoustics, Speech, and Signal Processing, 2005 . . vol. 1. IEEE, 2005.*
Huang, Xuedong, et al. "Microsoft Windows highly intelligent speech recognizer: Whisper." Acoustics, Speech, and Signal Processing, 1995. ICASSP-95., 1995 International Conference on. vol. 1. IEEE, 1995.*
Sin-Horng Chen, Wei-Tyng Hong, "A segment-based C/sub 0/ adaptation scheme for PMCbased noisy Mandarin speech recognition", Acoustics, Speech, and Signal Processing, IEEE International Conference on, vol. 01, No. , pp. 433-436, 1999.*
Graciarena M. et al.: "Combining Prosodic Lexical and Cepstral Systems for Deceptive Speech Detection", Proceedings IEEE International Conference on Acoustics, Speech and Signal Processing (ICASSP 2006), Toulouse, France, May 14-19, 2006, vol. 1, pp. 1033-1036, May 14, 2006, XP010930361.
Jan. 27, 2015—(WO) International Preliminary Report on Patentability—App PCT/US2012/047911.
International Search Report and Written Opinion dated Feb. 6, 2013 (PCT/US2012/047911); ISA/EP.
Graciarena Martin et al, "Combining Prosodic Lexical and Cepstral Systems for Deceptive Speech Detection", Proceedings IEEE International Conference on Acoustics, Speech and Signal Processing (ICASSP 2006), May 14, 2006, pp. 1033-1036, vol. 1, Toulouse, France.
Mar. 14, 2016—(EP) Examination Report—App 12743030.

* cited by examiner

FEATURE NORMALIZATION INPUTS TO FRONT END PROCESSING FOR AUTOMATIC SPEECH RECOGNITION

CROSS-REFERENCE TO RELATED APPLICATION

This application is the National Stage of International Application No. PCT/US2012/047911, filed Jul. 24, 2012, which is incorporated herein by reference.

FIELD OF THE INVENTION

The invention generally relates to automatic speech recognition (ASR), and more specifically, to front end feature normalization for ASR.

BACKGROUND ART

An automatic speech recognition (ASR) system determines a semantic meaning of input speech. Typically, the input speech is processed into a sequence of digital speech feature frames. Each speech feature frame can be thought of as a multi-dimensional vector that represents various characteristics of the speech signal present during a short time window of the speech. In a continuous recognition system, variable numbers of speech frames are organized as "utterances" representing a period of speech followed by a pause, which in real life loosely corresponds to a spoken sentence or phrase.

The ASR system compares the input speech frames to find statistical models that best match the speech feature characteristics and determine a corresponding representative text or semantic meaning associated with the statistical models. Modern statistical models are state sequence models such as hidden Markov models (HMMs) that model speech sounds (usually phonemes) using mixtures of Gaussian distributions. Often these statistical models represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the statistical models are organized together as words, phrases, and sentences, additional language-related information is also typically incorporated into the models in the form of language modeling.

The words or phrases associated with the best matching model structures are referred to as recognition candidates or hypotheses. A system may produce a single best recognition candidate—the recognition result—or a list of several hypotheses, referred to as an N-best list. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

In order to compensate for audio channel effects, speech recognition systems typically employ techniques such as Cepstral Mean Normalization (CMN) and Cepstral Variance Normalization (CVN) on the input sequence of speech features in order to map the speech features into a more unified space and to reduce channel dependence. There are many different variations to implement CMN and/or CVN effectively; for example, for ASR systems that run in real time online (i.e. with minimal latency incurred) a filter or windowing approach is used. In addition or alternatively, a separate normalization can be done for speech and silence portions of the speech input. One disadvantage of conventional CMN (and CVN) is that the information about the absolute energy level of the speech features is lost. Some other alternative normalization approach could make use of this information.

Each normalization approach comes with its own specific advantages and disadvantages. For example, a longer window gives a better mean estimation, but may not track changes in the channel that well. Or the mean may be estimated only from speech- containing portions of the input, not during silences (e.g., using a voice activity detector (VAD)). This makes the normalization more invariant against the noise level of the signal, which improves recognizer performance, but it is important that the VAD functions well; when it does not, performance can degrade. There are also various different ways to normalize other speech features besides the mean.

SUMMARY OF THE INVENTION

Embodiments of the present invention include a computer-implemented method for front end speech processing for automatic speech recognition. A sequence of speech features that characterize an unknown speech input is received with a computer process. A first subset of the speech features is normalized with a computer process using a first feature normalizing function. A second subset of the speech features is normalized with a computer process using a second feature normalizing function different from the first feature normalizing function. The normalized speech features in the first and second subsets are combined with a computer process to produce a sequence of mixed normalized speech features for automatic speech recognition.

A computer process may be used to perform automatic speech recognition of the mixed normalized speech features. At least one of the feature normalizing functions may be a cepstral mean normalizing function or a maximum normalizing function. The speech input may include speech portions and non-speech portions, and one feature normalizing function may be for the non-speech portions and the other feature normalizing function may be for the speech portions. The first subset of speech features may include a speech energy feature and the first feature normalizing function may normalize the speech energy feature. The steps may be performed in real time with minimum response latency. The mixed normalized speech features may be combined using linear discriminant analysis (LDA) or some other feature space or model space approach.

DETAILED DESCRIPTION OF SPECIFIC EMBODIMENTS

Various embodiments of the present invention are directed to techniques to improve ASR system robustness to channel model mismatches based on improved normalization of speech features such as by use of multiple normalization schemes. For example, one embodiment of the present invention combines speech features normalized in different ways (e.g., using Linear Discriminant Analysis (LDA)) to improve overall speech recognition system performance and robustness. Combining speech features normalized using different techniques helps mitigate the disadvantages of any one specific technique. While the following describes combining speech features based on LDA, there are many other specific possibilities for speech feature combination. For example, in the feature space using neural networks and/or feature-based minimum phone error (fMPE), or in the model space using confusion network combination (CNC) or multiple feature streams.

Figure 1:
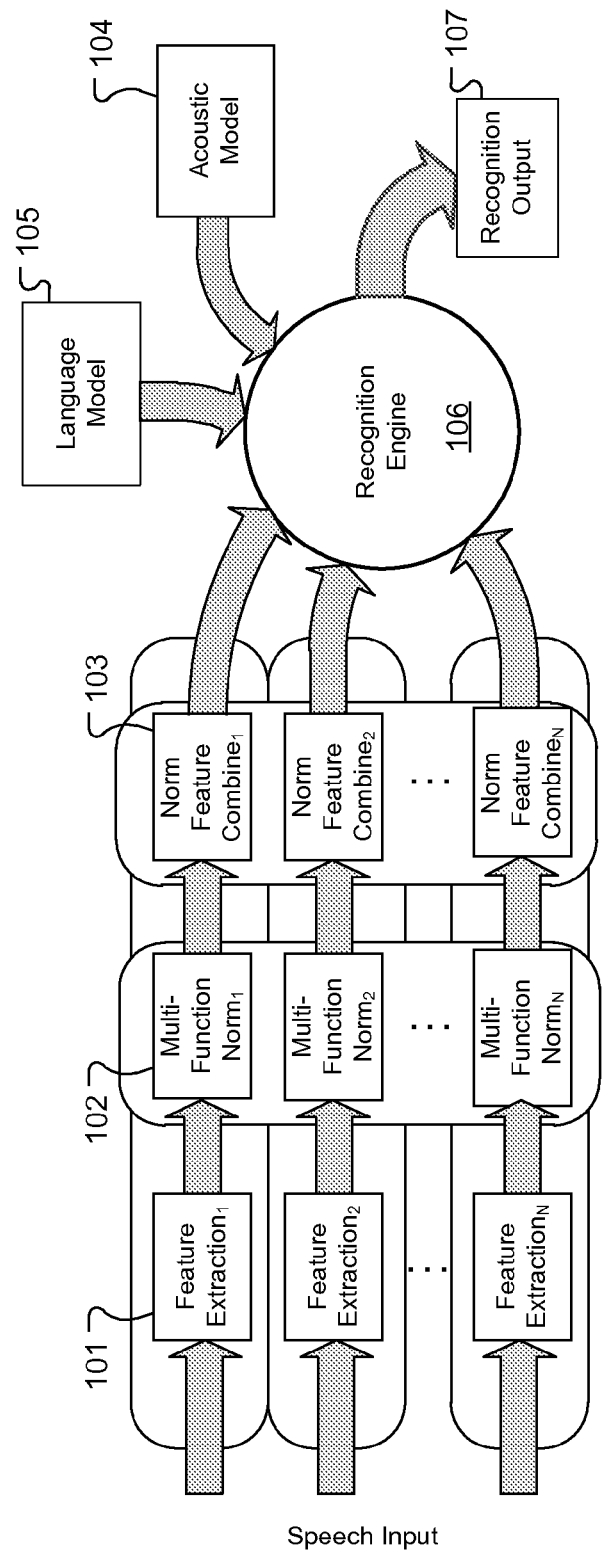
FIG. 1 shows an example of ASR system according to one embodiment of the present invention.
Figure 2:
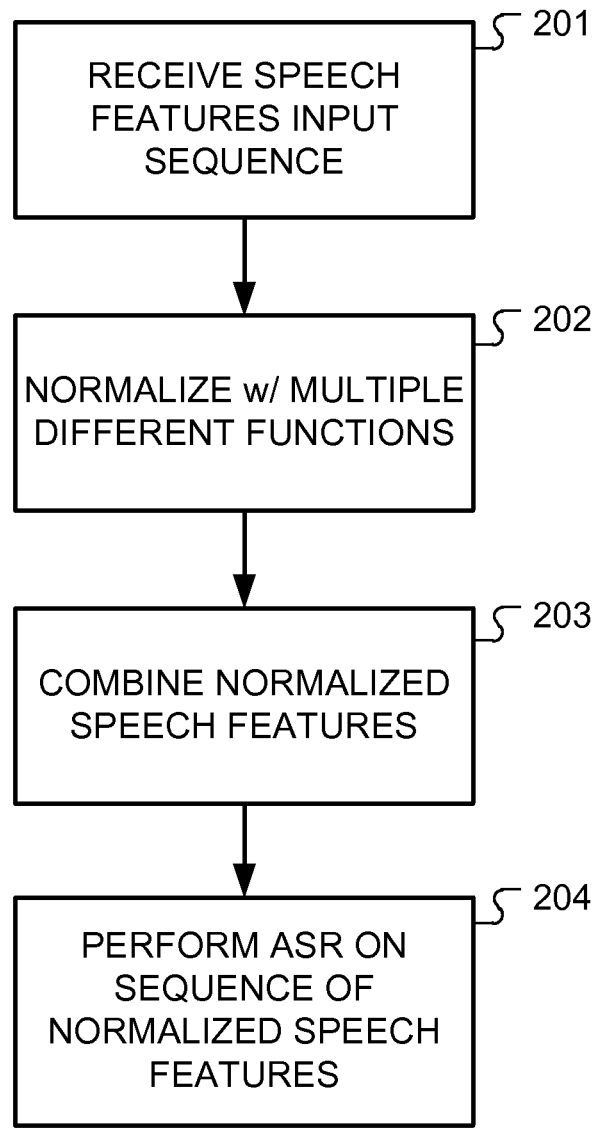
FIG. 2 shows various logical steps in a method of front end speech feature processing according to an embodiment of the present invention.

FIG. 1 shows an example of an ASR system and FIG. 2 shows various logical steps in a method of front end speech feature processing according to an embodiment of the present invention. An unknown speech signal from one of a variety of source channels 1-N is input to a feature extraction module 101 of the ASR system 100. The feature extraction module 101 uses a computer process to create a sequence of representative speech features that characterize a given unknown speech input, step 201. A multifunction normalization module 102 uses a computer process to normalize selected speech features using multiple different normalizing functions, step 202. For example, the multifunction normalization module 102 may use a cepstral mean normalizing (CMN), a cepstral variance normalizing (CVN) function and/or a maximum normalizing function. The selected speech features may include a speech energy feature and the corresponding feature normalizing function may normalize the speech energy feature. In addition or alternatively, the multi-function normalization module 102 may include a voice activity detection (VAD) functionality to differentiate between speech portions and non-speech portions of the speech input, and one feature normalizing function may be for the non-speech portions and the other feature normalizing function may be for the speech portions. The multi-function normalization module 102 may operate in real time with minimum response latency.

A feature combine module 103 uses a computer process to combine the normalized speech features, step 203, to produce a mixed sequence of mixed normalized speech features for automatic speech recognition by the recognition engine 104, step 204. For example, the feature combine module 103 may combine the normalized speech features using linear discriminant analysis (LDA) or some other feature space or model space approach.

Various sets of experiments have been performed to investigate how system performance can be improved by combining speech features using different normalizations. For example, one important input speech feature with regards to normalization is C0, the average log-energy of a given speech frame. A conventional set of speech features contains a C0 feature that receives the default normalization—various experiments explored adding C0 as an extra speech feature using an alternative normalization such as normalizing by the max (C0-nom-max) and C0 normalized with an alternative CMN (C0-alt-norm). The combination was done by concatenating the additional speech feature to the regular set of speech features (of which there were 48: 12 each of MFCCs, deltas, double-deltas, and triple-deltas) and reducing the final dimensionality down to 32 by LDA.

For the experiments using C0-norm-max, the concept was to normalize C0 by subtracting the max C0 value calculated over the whole utterance. Two variants were considered: (1) batch-mode computing the true maximum, and (2) online mode estimating the maximum at the start of the utterance and updating it throughout the utterance:

|  | WER % | WERR % | RTF |
|---|---|---|---|
| Baseline ML | 14.69 |  | 1.39 |
| Batch max-norm C0 ML | 14.29 | 2.72 | 1.29 |
| Online (first samp) max-norm C0 ML | 14.46 | 1.57 |  |
| Baseline DT | 12.65 |  | 1.11 |
| Batch max-norm C0 DT | 12.15 | 3.95 | 1 |
| Online (first samp) max-norm C0 DT | 12.24 | 3.24 |  |

It can be seen that adding C0-max-norm reduced WER by 3.24%.

Experiments using C0-alt-norm also applied CMN to C0 using a different implementation from the standard set of speech features. Specifically, the C0-alt-norm term did not use a VAD but instead used a histogram to estimate the mean speech level. In addition, an utterance was only normalized if its mean C0 value was below a given target threshold. Other detail differences applied also. This particular normalization was previously known to be good against utterances with very low gain, so the table below shows results for various levels of attenuation applied on the test set:

|  | baseline | With additional C0 alt norm | |
|---|---|---|---|
|  | WER | WER | WERR |
| no atten | 12.65 | 12.37 | 2.21 |
| 18 dB | 12.84 | 12.53 | 2.41 |
| 24 dB | 13.14 | 12.64 | 3.81 |
| 30 dB | 13.58 | 12.95 | 4.64 |

It can be seen that adding this feature improved performance and that the improvement increased with the amount of attenuation. This suggests that it might be interesting to investigate adding both the above features together to the regular set of speech features, as well as considering other speech features, e.g., doing CMN without the VAD. Subtracting the maximum C0 over the utterance seems to provide robustness against insertions coming from low gain side speech and other noise.

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented as a computer program product for use with a computer system, for example, as a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method comprising:
    receiving, by a computing device, a sequence of speech features that characterize an unknown speech input, the sequence of speech features including speech portions and non-speech portions;
    determining, using voice activity detection (VAD), the speech portions of the sequence of speech features;
    determining C0 for the sequence of speech features, wherein C0 comprises an average log-energy of a given speech frame of the sequence of speech features;
    normalizing selected speech features of the sequence of speech features using a plurality of different feature normalizing functions including a first function used only for the speech portions and a second function used only for the non-speech portions, wherein the first function normalizes the C0 by subtracting a max C0 value calculated over the speech portions of the sequence of speech features, wherein the max C0 value is initially estimated at a start of an utterance including the given speech frame and subsequently updated throughout the utterance; and
    concatenating the normalized C0 with the sequence of speech features to produce a sequence of mixed normalized speech features for automatic speech recognition of the speech portions of the sequence of speech features.

2. The method of claim 1, further comprising:
    performing automatic speech recognition of the sequence of mixed normalized speech features.

3. The method of claim 1, wherein at least one feature normalizing function of the plurality of different feature normalizing functions is a cepstral mean normalizing function.

4. The method of claim 1, wherein at least one feature normalizing function of the plurality of different feature normalizing functions is a cepstral variance normalizing function.

5. The method of claim 1, wherein the selected speech features comprise a speech energy feature and at least one feature normalizing function of the plurality of different feature normalizing functions normalizes the speech energy feature.

6. The method of claim 1, comprising:
    combining the normalized selected speech features using linear discriminant analysis (LDA) to produce the sequence of mixed normalized speech features.

7. The method of claim 1, comprising:
    combining the normalized selected speech features in the feature space using neural networks to produce the sequence of mixed normalized speech features.

8. The method of claim 1, comprising:
    combining the normalized selected speech features in the feature space using feature-based minimum phone error (fMPE) to produce the sequence of mixed normalized speech features.

9. The method of claim 1, comprising:
    combining the normalized selected speech features in the model space using confusion network combination (CNC) to produce the sequence of mixed normalized speech features.

10. One or more non-transitory computer-readable media storing executable instructions that, when executed by a processor, cause a device to:
    receive a sequence of speech features that characterize an unknown speech input, the sequence of speech features including speech portions and non-speech portions;
    determine, using voice activity detection (VAD), the speech portions of the sequence of speech features;
    determine a mean C0 value for the sequence of speech features, wherein C0 comprises an average log-energy of a given speech frame of the sequence of speech features,
    normalize selected speech features of the sequence of speech features using a plurality of different feature normalizing functions including a first function used only for the speech portions and a second function used only for the non-speech portions, wherein the first function normalizes the C0 by subtracting a max C0 that is estimated at a start of an utterance including the given speech frame and subsequently updated throughout the utterance; and
    combine the normalized selected speech features to produce a sequence of mixed normalized speech features for automatic speech recognition of the speech portions of the sequence of speech features.

11. The non-transitory computer-readable media of claim 10, storing executable instructions that, when executed by the processor, cause the device to:
    perform automatic speech recognition of the sequence of mixed normalized speech features.

12. The non-transitory computer-readable media of claim 10, wherein at least one feature normalizing function of the plurality of different feature normalizing functions is a cepstral mean normalizing function.

13. The non-transitory computer-readable media of claim 10, wherein at least one feature normalizing function of the plurality of different feature normalizing functions is a cepstral variance normalizing function.

14. The non-transitory computer-readable media of claim 10, wherein at least one feature normalizing function of the plurality of different feature normalizing functions is a maximum normalizing function.

15. The non-transitory computer-readable media of claim 10, wherein the selected speech features comprise a speech energy feature and at least one feature normalizing function of the plurality of different feature normalizing functions normalizes the speech energy feature.

16. The non-transitory computer-readable media of claim 10, wherein the normalized selected speech features are combined using linear discriminant analysis (LDA) to produce the sequence of mixed normalized speech features.

17. A system comprising:
   at least one processor; and
   non-transitory memory storing computer-readable instructions that, when executed by the at least one processor, cause the system to:
   receive a sequence of speech features that characterize an unknown speech input, the sequence of speech features including speech portions and non-speech portions;
   determine, using voice activity detection (VAD), the speech portions of the sequence of speech features;
   determine C0 for the sequence of speech features, wherein C0 comprises an average log-energy of a given speech frame of the sequence of speech features,
   determine a mean C0 value for the sequence of speech features;
   normalize selected speech features of the sequence of speech features using a plurality of different feature normalizing functions including a first function used only for the speech portions and a second function used only for the non-speech portions, wherein the first function normalizes the C0 by subtracting a max C0 value calculated over the speech portions of the sequence of speech features, wherein the max C0 value is initially estimated at a start of an utterance including, the given speech frame and subsequently updated throughout the utterance; and
   concatenate the normalized C0 with the sequence of speech features to produce a sequence of mixed normalized speech features for automatic speech recognition of the speech portions of the sequence of speech features.

18. The system of claim 17, wherein the non-transitory memory stores further computer-readable instructions that, when executed by the at least one processor, cause the system to:
   perform automatic speech recognition of the sequence of mixed normalized speech features.

19. The system of claim 17, wherein at least one feature normalizing function of the plurality of different feature normalizing functions is one of a cepstral mean normalizing function and a cepstral variance normalizing function.

20. The system of claim 17, wherein the non-transitory memory stores further computer-readable instructions that, when executed by the at least one processor, cause the system to:
   combine the normalized selected speech features using linear discriminant analysis (LDA) to produce the sequence of mixed normalized speech features.

* * * * *